United States Patent
Fuchs et al.

(10) Patent No.: US 10,414,346 B2
(45) Date of Patent: Sep. 17, 2019

(54) VEHICLE WITH CAMERA UNIT

(71) Applicant: GM GLOBAL TECHNOLOGY OPERATIONS LLC, Detroit, MI (US)

(72) Inventors: Michael Fuchs, Ruesselsheim (DE); Friedrich Hein, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 315 days.

(21) Appl. No.: 15/293,937

(22) Filed: Oct. 14, 2016

(65) Prior Publication Data

US 2017/0106808 A1    Apr. 20, 2017

(30) Foreign Application Priority Data

Oct. 14, 2015 (DE) .................. 10 2015 013 315

(51) Int. Cl.
| | | |
|---|---|---|
| B60R 1/00 | (2006.01) | |
| B60R 1/12 | (2006.01) | |
| H04N 7/18 | (2006.01) | |
| B60R 11/04 | (2006.01) | |
| H04N 5/225 | (2006.01) | |
| B60R 13/00 | (2006.01) | |

(52) U.S. Cl.
CPC ............ *B60R 11/04* (2013.01); *B60R 13/005* (2013.01); *H04N 5/2252* (2013.01); *H04N 5/2257* (2013.01)

(58) Field of Classification Search
CPC .. B60R 11/04; B60R 1/00; H04N 7/18; G03B 17/56
USPC ....................................................... 348/148
See application file for complete search history.

(56) References Cited

U.S. PATENT DOCUMENTS

| | | |
|---|---|---|
| 8,243,137 B2 | 8/2012 | Schuetz |
| 8,961,044 B2 | 2/2015 | Barthel |
| 9,167,139 B2 | 10/2015 | Schutz |
| 9,321,410 B2 | 4/2016 | Hansen |
| 2009/0231430 A1* | 9/2009 | Buschmann ......... B60Q 1/0023 348/148 |
| 2013/0235204 A1 | 9/2013 | Buschmann |
| 2017/0001578 A1* | 1/2017 | Buschmann ............ B60R 11/04 |

FOREIGN PATENT DOCUMENTS

| | | | |
|---|---|---|---|
| DE | 102009008281 | * 8/2010 | ............... B60R 1/00 |
| DE | 102009008281 A1 | 8/2010 | |
| DE | 102013018022 A1 | 5/2015 | |

OTHER PUBLICATIONS

German Patent Office, German Search Report for German Application No. 102015013315.2, dated Aug. 16, 2016.

* cited by examiner

*Primary Examiner* — Patricia I Young
(74) *Attorney, Agent, or Firm* — Lorenz & Kopf, LLP

(57) ABSTRACT

A camera unit for a vehicle includes a camera and a closure element, which are moveable by a drive unit between a first position, in which the closure element covers the field of vision of the camera and a second position, in which a region of the surroundings of the vehicle to be monitored lies in the field of vision of the camera. A first movement direction of the camera from the first position into the second position and a second movement direction of the closure element from the first position into the second position define an angle and a surface normal of the outer skin of the vehicle at the place of installation of the camera unit lies within the angle.

11 Claims, 4 Drawing Sheets

VEHICLE WITH CAMERA UNIT

CROSS-REFERENCE TO RELATED APPLICATION

This application claims priority to German Patent Application No. 102015013315.2, filed Oct. 14, 2015, which is incorporated herein by reference in its entirety.

TECHNICAL FIELD

The present disclosure pertains to a vehicle with a camera unit having a camera configured to detect an outside region behind the vehicle and a closure element configured to protect the camera from dirt and damage when not in use.

BACKGROUND

Conventional camera units, such as that disclosed in DE 10 2013 018 022, generally include a camera, which in a position of rest, is concealed in a receiving space in the interior of the vehicle behind a closure element that lies in a viewing direction of the camera. In order to reach an operating position, wherein the closure element no longer impairs the field of vision of the camera, the camera and closure element have to first move in a same direction, perpendicularly to the outer skin of the vehicle, until the camera is located in front of the outer skin an that the camera can be pivoted downwards for imaging the road surface immediately behind the vehicle in a field of vision for the camera. The parallel movement of the camera and closure element requires a large installation depth of the camera unit on the vehicle. Moreover, the combination of translation and tilting movement of the camera further complicates a guiding mechanism.

The movement of camera and closure element is driven via an eccentric, the rotary movement freedom of which is restricted by a housing guiding the translation of the closure element. In order to bring the camera unit from the operating position into the first position, the eccentric has to rotate in a direction other than during the shifting from the first position into the operating position.

SUMMARY

The present disclosure provides a camera unit for a vehicle which requires a reduced installation depth. According to a configuration of the present disclosure, the camera unit includes a camera and a closure element, which is moveable by a drive unit between a resting or first position wherein the closure element conceals the field of vision of the camera and an operating or second position wherein a region of the surroundings of the vehicle lies in the field of vision of the camera. A first movement direction of the camera from the first position into the second position and a second movement direction of the closure element from the first position in the second position define an angle and a surface normal of the outer skin of the vehicle at the place of installation of the camera unit lies within the angle. Because of the non-parallel movement of camera and closure element, the closure element is moved out of the field of vision of the camera without requiring a tilting movement of the camera. Since the movement direction of both the camera and also of the closure element is obliquely to the surface normal, the space requirement in the direction of the surface normal is reduced.

Preferably, the camera unit includes two plates that are located opposite one another having first guide contours extending in the first direction and second guide contours extending in the second direction formed therein.

The camera and the closure element can be placed on support plates which extend between the plates of the frame and are displaceably engaged with the guide contours. Accordingly, the camera and the closure element can be displaced relative to one another in the defined angle.

The plates of the frame are configured to be separable elements in order to assemble the camera unit in the production more easily. When the plates are spread apart, the support plates of the camera and the closure element can be initially brought into engagement with the guide contour of one of the plates of the frame. Once the camera and closure element are so positioned, the plates of the frame are subsequently move together again to establish engagement with the respective other guide contour. In one embodiment, abridge pivotally connects the plates in order to guide the movement of the plates into the spread-apart position and subsequently facilitate establishing the engagement on both plates. The first guide contour and the second guide contour of a plate should preferably define an angle between 60 and 120 degrees, so that the camera and the closure element with reduced installation depth can be effectively pushed apart.

For driving the movement of the camera and/or of the closure element between the first position and the second position, an eccentric should be rotatable about an axis free of a stop. Accordingly it is sufficient that the drive unit rotates in only one direction. A circuit for controlling a directional change of the drive unit is not required. At least one link can be connected to the camera or the closure element and to the eccentric in an articulated manner. Because of this, a rotation of the drive unit can be positioned into a translational movement for moving the camera or the closure element.

When two links are provided, a first fulcrum, on which the first link acts on the eccentric, and a second fulcrum, on which the second link acts on the eccentric, may define an angle on the axis about which the eccentric rotates, which corresponds to the angle between the first and the second guide contour. Accordingly it is ensured that the camera and the closure element in each case reach the first position and the second position without phase offset to one another.

Preferably, the camera unit can be operable in response to movement of a gear shift in the vehicle in order to assume the second position when the reverse gear is engaged. Accordingly, the camera, if the camera is installed at the rear, can always supply an image of a poorly visible rearward outside region whenever this is required.

It is practicable to likewise couple the camera unit to the gear shift in order to take up the first position when a forward gear is engaged. Accordingly, the camera can be automatically covered by the closure element and is protected from damage and dirt when not in use, without a driver of the vehicle having to additionally actuate an operating element.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
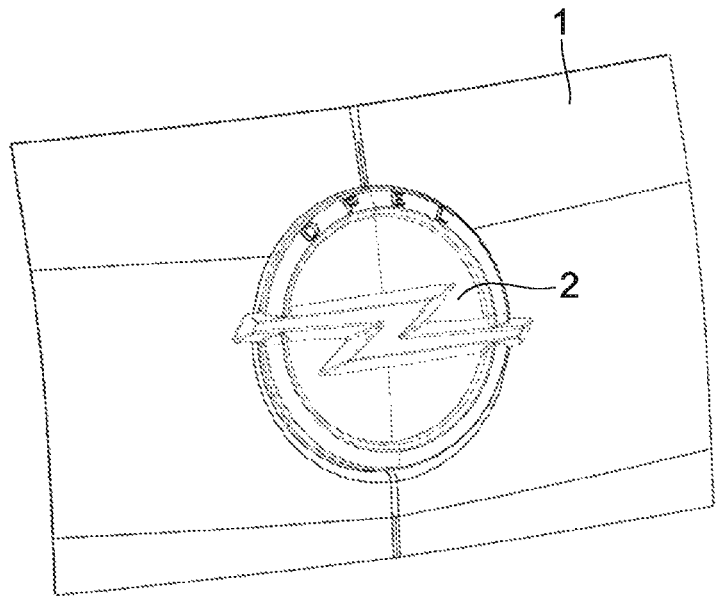
FIG. 1 is an extract of a tailgate of a motor vehicle with a camera unit according to the present disclosure in first position.
Figure 2:
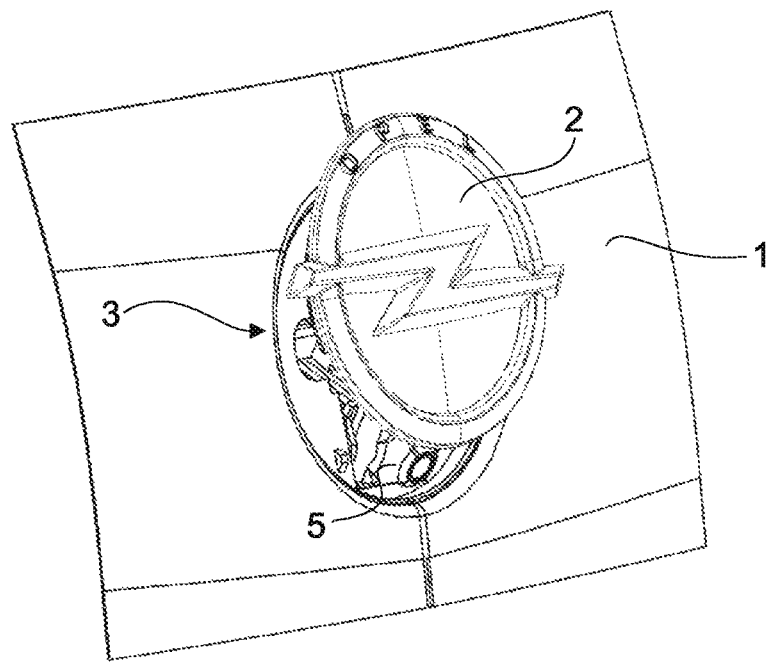
FIG. 2 is the extract of FIG. 1 with the camera unit in second position.

FIG. 1 shows a portion of the outer skin 1 of a motor vehicle, here a piece of a tailgate, on which an emblem is attached. The emblem forms a closure element 2 of a camera unit 3, which as shown in FIG. 2, can be moved out of a resting or first position in which it is flush with the outer skin 1 shown in FIG. 1 into an operating or second position shown in FIG. 2 in which a camera 5 that was concealed behind the closure element 2 in the first position is visible. A front lens of the camera 5 is directed obliquely downwards in order to capture the road surface immediately behind the vehicle and any obstacles thereon.

Figure 3:
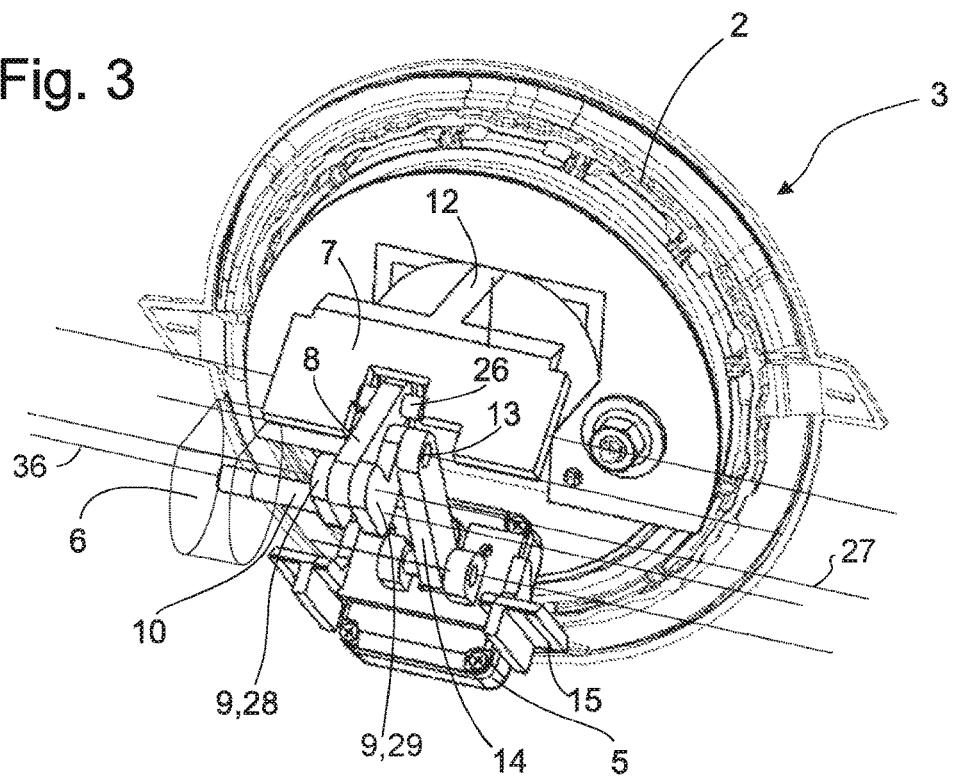
FIG. 3 shows a view of the camera unit

FIG. 3 shows the camera unit 3 without the outer skin 1 from a viewing direction opposite to that of FIGS. 1 and 2. The closure element 2 is detachably connected, here by threaded fasteners, to a shaft 12. The shaft 12 is unitarily connected to a support plate 7, which is inclined towards the closure element 2 at an angle of approximately 45°. In an open-edge cutout of the support plate 7, a shaft 26 is fastened on which a link 8 engages. An end of the link 8 facing away from the plate pivotably engages on an eccentric 9 about an axis 27.

The eccentric 9 in this case includes two arms 28, 29 which are rigidly connected by a shaft. The shaft is engaged about by the link 8 and defines the fulcrum of its pivot movement about the axis 27. The left arm 28 connects the shaft to a driveshaft 10, in order to guide the fulcrum on a circular path upon a rotation of the driveshaft 10 driven by an electric motor 6. The right arm 29 connects the shaft which is not visible to a fulcrum 18 on which a second link 14 engages. Analogously to the connection of the link 8 to the support plate 7, the link 14 is connected to a support plate 15 on which the camera 5 is mounted. This support plate 15 is also inclined at approximately 45° against the closure element 2, however in the opposite direction of the support plate 7, so that the two support plates together define an angle of approximately 90° that is open towards the closure element 2.

Figure 4:
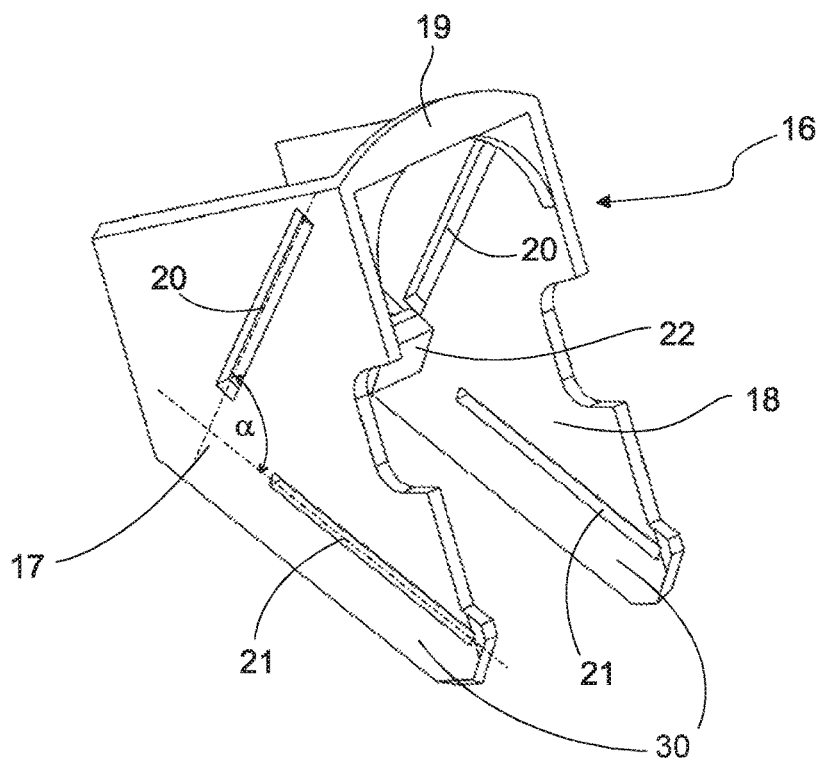
FIG. 4 shows a frame for receiving the camera unit.

FIG. 4 shows a frame 16 which is provided in order to receive the camera unit 3. The frame 16 includes two plates 17, 18 which lie parallel opposite one another, which are elastically pivotably connected to one another via a bridge 19. Upper guide contours 20 and other guide contours 21 are recessed out of the plates 17, 18. The upper guide contours 20 are provided in order to receive edges of the support plate 7 and thus guide the movement of the closure element 2 between the first position and the second position; accordingly, the lower guide contours 21 receive edges of the support plate 15 and guide the movement of the camera 5.

The linearly elongated guide contours 20, 21 define an angle a that corresponds to the abovementioned angle between the support plates 7, 15 or the movement directions of the camera 5 and of the closure element 2 guided by the guide contours 20, 21 and the support plates 7, 15 engaging into these.

In a first assembly step, the plates 17, 18 are spread apart at their lower edges 30 and the support plate 17 coming from below is pushed into the guide contours 20. Following this, the plates 17, 18 are merely spread apart at their front tips, so that the engagement of the support plate 7 in the guide contours 20 remains intact, while the support plate 15 is inserted into the guide contours 21. On the plate 18, a projection 22 facing the plate 17 is formed, on the back of which, which is not visible in FIG. 4, a channel is recessed. The driveshaft 10 is inserted into this channel.

Figure 5:
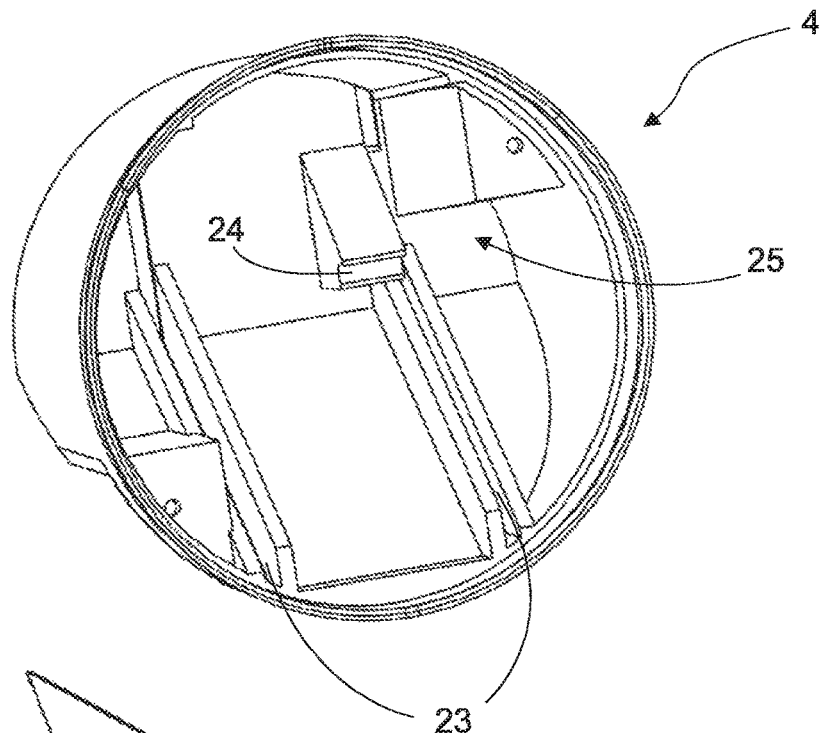
FIG. 5 shows a housing which receives the camera unit and the frame.

In FIG. 5, a housing 4 is shown which is provided in order to be mounted under the outer skin 1 and receive the camera unit 3 that is preassembled in the frame 16. Two grooves 23 receive the lower edges 30 of the plates 17, 18. Pivoting-apart of the plates 17, 18, by way of which the support plates 7, 15 could disengage from the guide contours 20, 21, is thus no longer possible. A channel 24 of the housing complements the channel of the projection 22 into a bearing engaging about the shaft 10. In extension of the channel 24, on the other side of the right groove 23, an installation space 25 for the electric motor 6 is located.

Figure 6:
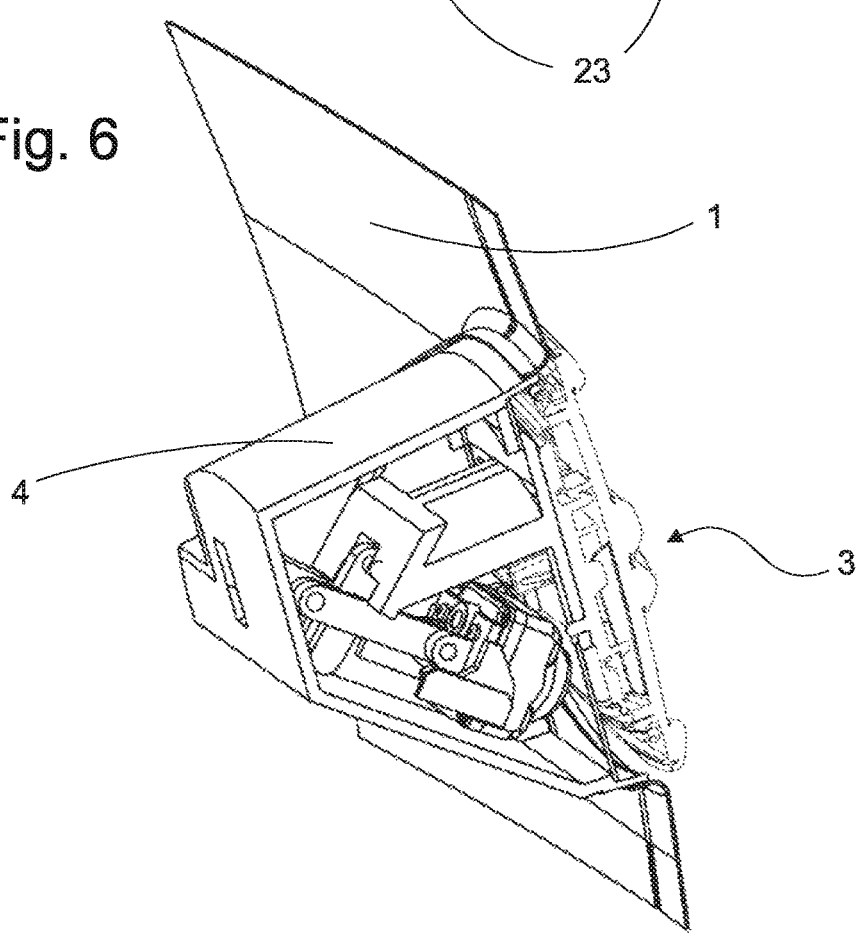
FIG. 6 is a detailed section through the camera unit in the first position.
Figure 7:
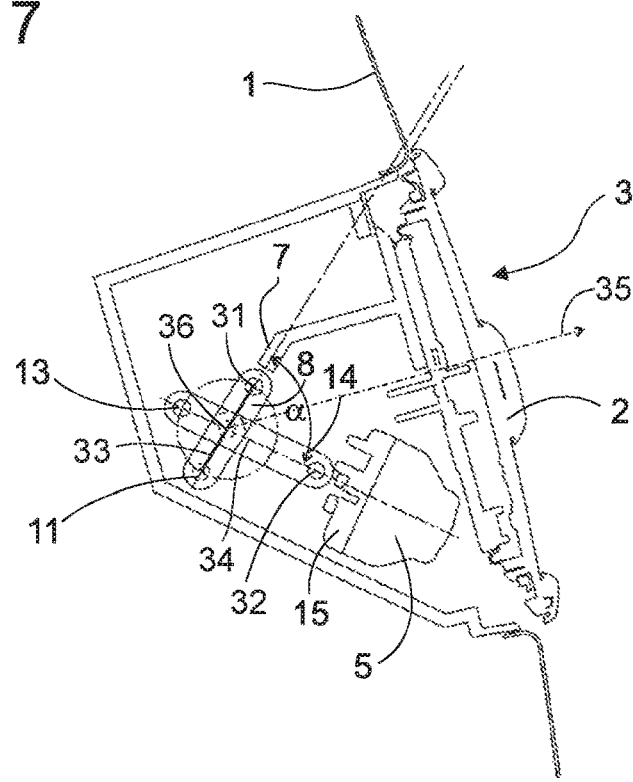
FIG. 7 is a schematic section through the camera unit in the first position.

FIG. 6 shows a section through the camera unit 3 finish-installed in the housing 4 in the first position. FIG. 7, similar to FIG. 6, shows the camera unit in the first position in a simplified, schematic form.

A section, which connects a fulcrum 31, on which the link 8 engages on the support plate 7 to a fulcrum 11, on which the same link 8 engages on the non-visible shaft connecting the arms 28, 29, is marked with 33, a section which connects the fulcrum 13 of the link 14 to a fulcrum 32, on which this link 14 engages on the support plate 15, is marked 34. Both sections 33, 34 run parallel to the guide contour 20 and 21 respectively and guide the movement of the link 8 and 14 respectively concerned. The sections 33, 34 cross one another on the axis of rotation 36 of the driveshaft 10 and in the process define the angle a that is open towards the closure element. A surface normal 35 of the outer skin 1 is simultaneously angle bisector of the angle α. The distance of the fulcrums 31, 32 from the axis 36 of the driveshaft 10 in this position is minimal.

Figure 8:
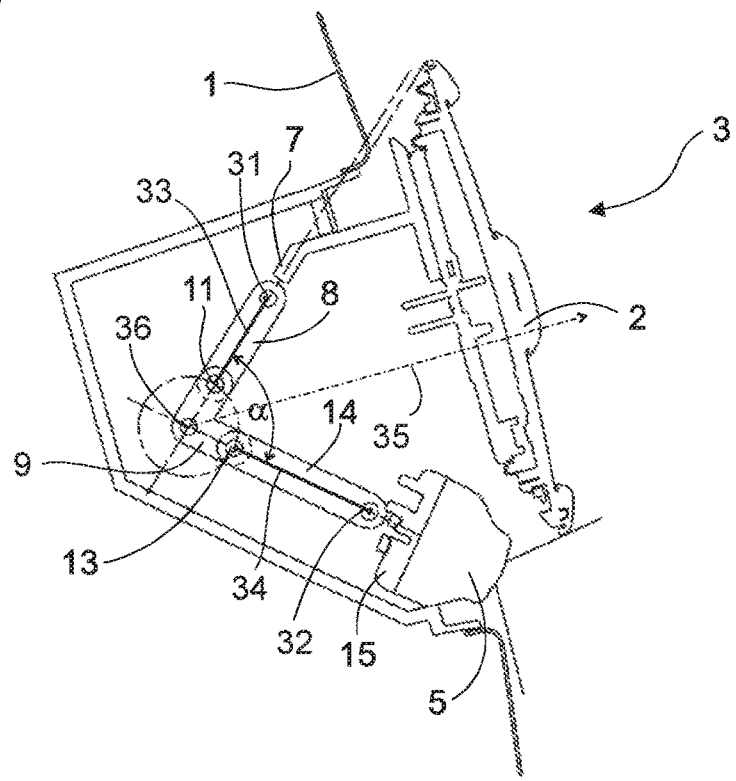
FIG. 8 is a schematic section through the camera unit in the second position.

FIG. 8, similar to FIG. 7, shows the camera unit in simplified schematic form, however in the second position. In order to move the camera unit 3 from the first position, as shown in FIG. 7, into the second position, shown in FIG. 8, the driveshaft 10 is rotated by 180° by the electric motor 6 with any direction of rotation. Following the rotation by 180°, the fulcrums 11, 31 again come to lie on a straight line with the driveshaft 10 and also the fulcrums 13, 32 with the driveshaft 10. The driveshaft 10 however no longer lays between the fulcrums 11, 31 and the fulcrums 13, 32, but left thereof, so that the distance of the fulcrums 31, 32 from the axis 36 of the driveshaft 10 is maximal.

In order to move the camera unit 3 back into the first position, the electric motor 6 again rotates the drive shafts 10 by 180°. This rotation can be effected with the same direction of rotation as the preceding one such that the motor 6 does not have to operate in reverse rotation.

The camera unit 3 may be operably coupled to a gear shift of a vehicle. When a drive engages the reverse gear, the closure element 2 and the camera 5 are moved into the second position so that outside regions behind the vehicle, which are not visible to the driver, can be recorded by the camera 5 and displayed on a display monitor that is clearly visible by the driver. As soon as a forward gear is engaged, the closure element 2 and the camera 5 move back into the first position in order to protect the camera 5 from dirt during normal driving.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A camera unit installable at a location in an outer skin of a vehicle comprising:
   a camera movable in a first linear movement direction;
   a closure element movable in a second linear movement direction;
   a drive unit coupled to the camera and the closure element and positionable from a first position wherein the closure element conceals a field of vision of the camera and a second position wherein the field of vision is configured to monitor a region surrounding the vehicle; and
   a frame comprising a first frame plate, a second frame plate located opposite the first frame plate, each of the first and second frame plates having a first guide contour running in the first linear movement direction and cooperating with the camera and a second guide contour running in the second linear movement direction and cooperating with the closure element;
   wherein an angle of between 60 and 120 degrees is defined between the first linear movement direction of the camera and the second linear movement direction of the closure element, and wherein a surface normal of the outer skin at the location of installation lies within the angle defined between the first linear movement direction of the camera and the second linear movement direction of the closure element.

2. The camera unit according to claim 1, wherein the surface normal bisects the angle.

3. The camera unit according to claim 1, further comprising a first support plate supporting the camera and a second support plate supporting the closure, wherein the first and second support plates extend between the first and second frame plates and are slidably positionable within the first and second guide contours respectively.

4. The camera unit according to claim 3, wherein the first and second frame plates are separable to disengage the first and second support plates.

5. The camera unit according to claim 3, further comprising a bridge pivotably connecting the first and second support plates.

6. The camera unit according to claim 1, wherein the drive unit comprises an eccentric configured to drive movement of the camera and the closure element between the first position and the second position, wherein the eccentric is freely rotatable about an axis.

7. The camera unit according to claim 6, further comprising a link connected in an articulated manner to the eccentric and at least one of the camera and the closure element.

8. The camera unit according to claim 7, further comprising a first link connected to the eccentric and the camera in an articulated manner and a second link connected to the eccentric and the closure element in an articulated manner.

9. The camera unit according to claim 8, wherein a first fulcrum on which the first link engages on the eccentric, and a second fulcrum on which the second link engages on the eccentric define an angle on the axis which corresponds to the angle between the first and the second movement directions.

10. The camera unit according to claim 1, wherein the camera unit is included in a vehicle comprising a gear shift, wherein the camera unit is rearward facing and operably coupled to the gear shift in order to assume the second position when the gear shift is positioned in a reverse gear.

11. The a camera unit according to claim 1, wherein the camera unit is included in a vehicle comprising a gear shift, wherein the camera unit is forward facing and operably coupled to the gear shift in order to assume the second position when the gear shift is positioned in a forward gear.

\* \* \* \* \*